W. Frederick
Boot-Edge Plane
Nº 57,193.  Patented Aug. 28, 1866.

Witnesses:  Inventor:
Wm Frederick
per Munn & Co
Attorneys

UNITED STATES PATENT OFFICE.

WILLIAM FREDERICK, OF ASHLAND, PENNSYLVANIA.

IMPROVED BOOT AND SHOE EDGE PARER.

Specification forming part of Letters Patent No. 57,493, dated August 28, 1866.

*To all whom it may concern:*

Be it known that I, WILLIAM FREDERICK, of Ashland, Schuylkill county, State of Pennsylvania, have invented a new and useful Improvement in Boot and Shoe Edge Parers; and I do hereby declare that the following is a full, clear, and exact description thereof, which will enable others skilled in the art to make and use the same, reference being had to the accompanying drawings, forming part of this specification, in which—

Figure 1:
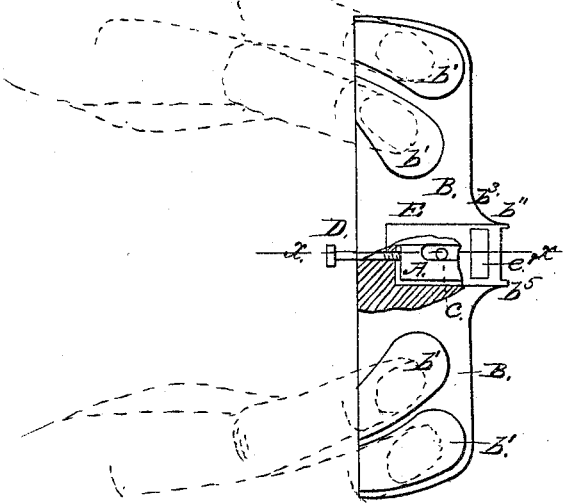
Figure 2:
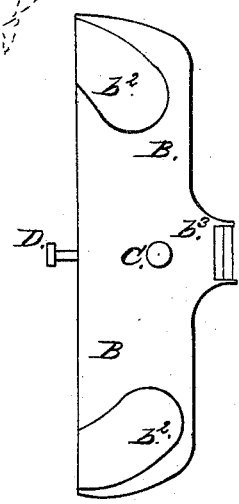
Figure 3:
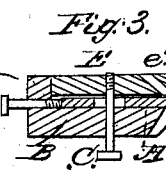

Figure 1 is a front view of my improved boot and shoe edge parer. Fig. 2 is a rear view of the same. Fig. 3 is a cross-section of the same, taken through the line $xx$. Fig. 1.

Similar letters of reference indicate like parts.

My invention has for its object to furnish a tool for paring or shaving the edges of the soles of boots and shoes, which will be convenient to use, will do the work quickly and well, and which will not be liable to cut or injure the uppers while paring or shaving the edges of the soles; and it consists of an instrument formed by combining a holder, cutter, and block or guard with each other, the parts being constructed and arranged as hereinafter more fully described.

B is the holder, which is made in the form represented in Figs. 1 and 2, and has indentations $b'$ in its front side and indentations $b^2$ in its rear side, as shown, to enable it to be more readily grasped and held by the person using it, as shown in red in Fig. 1. Upon the central part of the lower edge of the holder B is formed a projection, $b^3$, the sides of which projection terminate in two short arms, $b^4$ and $b^5$, one or the other of which runs in the crease between the sole and upper when the tool is being used to guide it, and prevents the cutter from coming in contact with the upper to cut or injure it. In the central part of the front side of the holder B is formed a recess or groove, into the bottom of which fits the cutter A. This cutter A is slotted longitudinally, as shown in Figs. 1 and 3, through which slot passes the set-screw C. This cutter is set out or in, to make a thinner or thicker cut, by the set-screw D, which passes down through the upper edge of the holder B, and operates upon the upper end of the cutter A, as shown in Figs. 1 and 3.

E is a block or guard fitting into and closing the recess or groove formed in the holder B, and being held in place, clamping the cutter A between itself and the holder, as shown, by the set-screw C. Through the front of the block E is formed a slot, $e'$, for the escape of the parings or shavings cut from the edge of the soles.

In using the instrument, the cutter A is set in the proper position by the set-screws C and D. The holder B is then grasped by the fingers and thumb, as shown in red in Fig. 1, and the instrument is pushed forward along the edge of the sole by a series of short quick strokes, paring the edge evenly, quickly, and without danger of cutting or injuring the uppers.

I claim as new and desire to secure by Letters Patent—

An improved boot and shoe edge parer, formed by combining the holder B, cutter A, and block E with each other, the said parts being constructed and arranged substantially as herein described, and for the purpose set forth.

WILLIAM FREDERICK.

Witnesses:
　GEO. D. HAUGHAWOUT,
　MICHAEL R. HOWES.